United States Patent [19]

Howell

[11] 4,266,259
[45] May 5, 1981

[54] LONG-TIME AND SHORT-TIME OVERCURRENT SIGNAL PROCESSOR FOR CIRCUIT BREAKER STATIC TRIP UNITS

[75] Inventor: Edward K. Howell, Simsbury, Conn.

[73] Assignee: General Electric Company, New York, N.Y.

[21] Appl. No.: 72,375

[22] Filed: Sep. 4, 1979

[51] Int. Cl.³ ............................................ H02H 3/093
[52] U.S. Cl. ............................................ 361/97; 361/94
[58] Field of Search ...................... 361/97, 96, 95, 94, 361/93, 196; 307/293

[56] References Cited

U.S. PATENT DOCUMENTS

| 3,317,795 | 5/1967 | Steen | 361/97 |
| 3,666,994 | 5/1972 | Watson et al. | 361/96 |
| 4,149,210 | 4/1979 | Wilson | 361/96 X |
| 4,209,818 | 6/1980 | Zylstra et al. | 361/96 |

Primary Examiner—Patrick R. Salce
Attorney, Agent, or Firm—Robert A. Cahill; Walter C. Bernkopf; Philip L. Schlamp

[57] ABSTRACT

An overcurrent signal is replicated by current mirrors for joint processing by a long-time trip mode network and a short-time trip mode network pursuant to initiating a circuit breaker trip function after an adjustably predetermined delay predicated on the overcurrent signal magnitude. The former network measures signal against a sloping I²t portion of an established trip time curve, while the latter optionally measures the overcurrent signal against a second I²t curve portion terminating in a selected one of plural fixed time delay curve portion. Short-time delay zone selective interlocking between upstream and downstream breakers and long-time delay pickup indication are also disclosed.

17 Claims, 5 Drawing Figures

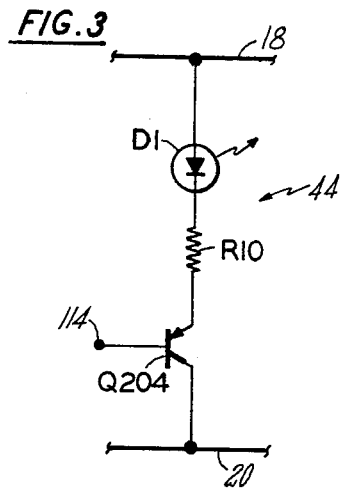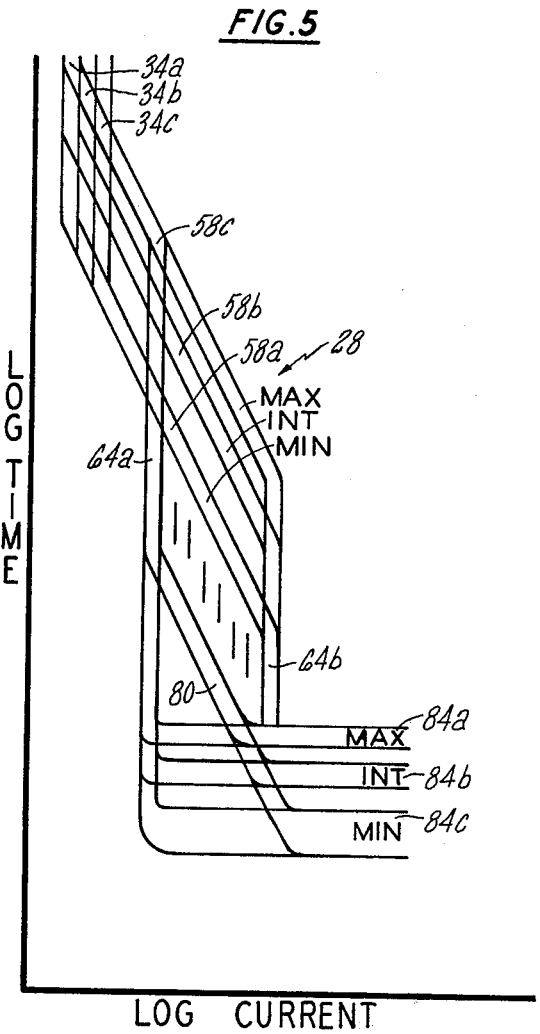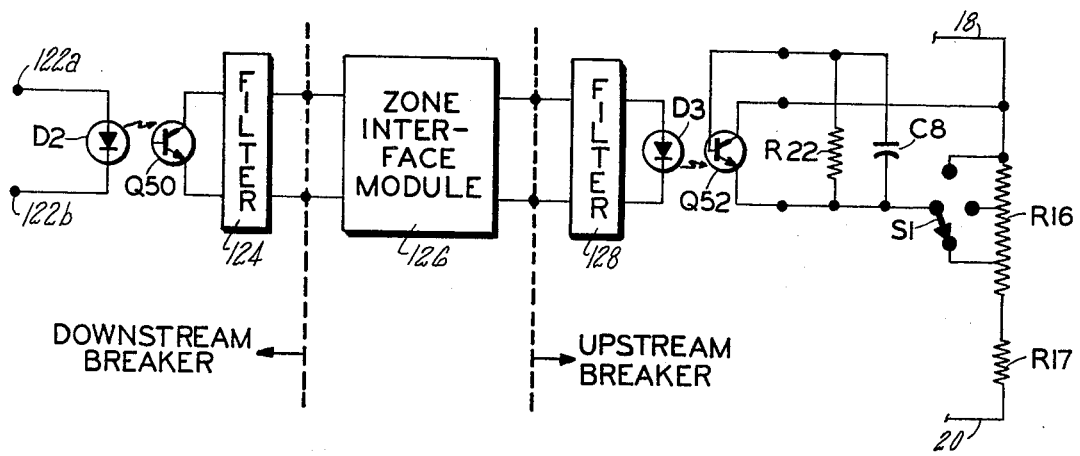

LONG-TIME AND SHORT-TIME OVERCURRENT SIGNAL PROCESSOR FOR CIRCUIT BREAKER STATIC TRIP UNITS

BACKGROUND OF THE INVENTION

The present invention relates to electronic solid state, i.e., static, trip units for industrial circuit breakers, and particularly to long-time and short-time overcurrent signal processing circuitry therefor.

Static trip units are being implemented in increasing numbers in industrial circuit breakers in place of the traditional thermal and magnetic trip units to initiate automatic circuit interruption by the circuit breaker in response to an overcurrent condition. The increasing popularity of static trip circuit breakers is largely due to their inherent versatility. That is, a static trip unit is readily susceptible to convenient trip setting adjustment such that a highly repeatable trip-time curve can be rather precisely tailored to a particular load so as to provide full over-current protection ranging from light overload to heavy short circuit proportions without nuisance tripping the circuit breaker in response to expected overcurrent conditions of a temporary nature. Having these capabilities, a static trip circuit breaker is quite amenable to selective trip coordination with the overcurrent response characteristics of circuit protective devices upstream and downstream thereto.

Typically, static trip units include a so-called "long-time" trip mode network and a so-called "short-time" trip mode network operating in coordination to jointly process an overcurrent signal indicative of an overcurrent condition on the distribution circuit to be protected. The long-time trip mode network is adjusted to establish an appropriate pickup level against which the signal indicative of the highest current flowing in any one of the distribution current conductors is measured to determine if an overcurrent condition exists. If the signal exceeds the selectively established long-time pickup level, the long-time trip mode network begins timing out a long-time delay before initiating circuit breaker tripping on an inverse time basis, preferably in accordance with the equation $I^2t = $ constant. Thus, the lower the overcurrent magnitude, the longer the delay to breaker tripping, and vice versa.

While the long-time trip mode network is devoted to protecting the distribution circuit against overcurrent conditions of overload proportions, the short-time trip mode network protects against higher levels of overcurrent from heavy overloads and upward. Thus, the short-time trip mode network is adjusted to establish an appropriate pickup level in excess of the long-time pickup level. If the overcurrent signal exceeds this elevated pickup level, the short-time trip mode network begins timing out a preselected fixed short-time delay before tripping the circuit breaker.

A typical static trip unit would also include a so-called "instantaneous" trip mode network having a pick-up level in excess of the short-time pickup level, which, if exceeded by the overcurrent signal, manifests a heavy short circuit condition on the distribution circuit. The instantaneous trip mode network, in response, initiates tripping of the circuit breaker essentially instantaneously, i.e., without intentional delay.

It is an object of the present invention to provide a circuit breaker static trip unit having improved overcurrent signal processing circuitry for performing the long-time and short-time trip functions.

Another object is to provide overcurrent signal processing circuitry of the above character having long-time and short-time trip mode networks operating in a uniquely coordinated manner to jointly process the overcurrent signals.

A further object is to provide overcurrent signal processing circuitry of the above character providing an adjustably selected circuit breaker time-current response characteristic capable of improved trip selective coordination with upstream and downstream circuit protective devices.

An additional object is to provide overcurrent signal processing circuitry of the above character operating to indicate when the long-time trip mode network is timing out a long-time delay.

Yet another object is to provide overcurrent signal processing circuitry of the above character accommodating zone selective interlocking with other like circuit breakers upstream and downstream thereto.

A still further object is to provide overcurrent signal processing circuitry of the above character which is efficient in construction and versatile in operation.

Other objects of the invention will in part be obvious and in part appear hereinafter.

SUMMARY OF THE INVENTION

In accordance with the present invention, there is provided a static trip unit for industrial circuit breakers having improved overcurrent signal processing circuitry. This processing circuitry includes a long-time trip mode network and a short-time trip mode network, each jointly responsive to an overcurrent signal indicative of the highest phase current flowing in a power distribution circuit. The long-time trip mode network includes means for selectively establishing a long-time pickup level and, when exceeded by the overcurrent signal, enables an integrator to integrate a current signal adjustably proportional to the square of the overcurrent signal as developed by a squaring circuit to which the overcurrent signal is also applied. The time varying voltage signal at the output of the integrator is applied to a comparator operative to issue a trip initiating signal when this voltage signal reaches equality with a reference voltage, thereby signifying the expiration of a long-time delay predicated on the equation $(I^2/A)t = $ constant; where I is the magnitude of the phase overcurrent, t is the duration of the long-time delay, and A is an adjustment factor. While a long-time delay is being timed out, an indication of this fact is generated by the long-time trip mode network. The long-time integrator is also controlled by a memory operating to reverse the rate of change of its time varying voltage output signal should the overcurrent signal drop below the established long-time pickup level while a long-time delay is being timed out.

The short-time trip mode network of the present invention also includes means for selectively establishing a short-time pickup level in excess of the long-time pickup level. When the overcurrent signal exceeds this elevated pickup level, switch means is activated to restrain operation of the long-time integrator and to enable a short-time integrator to integrate a current signal proportional to the square of the overcurrent signal as developed by another squaring circuit to which the overcurrent signal is also applied. The time varying voltage signal at the output of the short-time integrator is applied to the same comparator as the long-time integrator voltage signal, causing a trip initiating signal upon reaching equality with the comparator reference voltage. This inverse-time, short-time delay, also predicated on the equation ($I^2/A$) t=constant, is truncated into a selected one of plural fixed short-time delays by controlling a current limiter to limit the short-time squaring circuit output current to a preselected constant magnitude for all levels of overcurrent signal exceeding correspondingly preselected threshold levels. Alternatively, in accordance with the present invention, the inverse-time, short-time delay can be switched out, leaving the selected fixed short-time delay operative for all levels of overcurrent signal in excess of the established short-time pickup level. This is achieved by switching the short-time integrator current source from the short-time squaring circuit to a fixed current source.

Additionally in accordance with the present invention, the switch means in the short-time trip mode network is further operative to initiate generation of a zone selective interlock signal to an upstream circuit breaker while a short-time delay is being timed out. Moreover, the short-time trip mode network includes means responsive to a zone selective interlock signal from a downstream circuit breaker for changing the minimum fixed short-time delay to a preselected one of longer duration. Under these circumstances, selective trip coordination is achieved between upstream and downstream circuit breakers for overcurrent precipitating fault conditions sensed by the static trip units of both breakers. Yet, the upstream circuit breaker is prepared to impose the minimum fixed short-time delay for fault conditions existing intermediate it and the downstream circuit breaker.

The invention accordingly comprises the features of construction and arrangement of parts which will be exemplified in the construction hereinafter set forth, and the scope of the invention will be indicated in the claims.

For a better understanding of the nature and objects of the invention, reference should be had to the following detailed description taken in conjunction with the accompanying drawings, in which:

FIG. 3 is a circuit schematic diagram of the long-time pickup indicator circuit utilizable with the overcurrent signal processing circuitry of FIGS. 1 and 2;

FIG. 4 is a circuit schematic diagram, partially in block form, of zone selective input and output circuits utilizable with the overcurrent signal processing circuitry of FIGS. 1 and 2; and FIG. 5 is a graphical illustration of the family of trip time-current response curves achievable with the overcurrent signal processing circuitry of FIGS. 1 and 2.

Like reference numerals refer to corresponding parts throughout the several views of the drawing.

DETAILED DESCRIPTION

Figure 1:
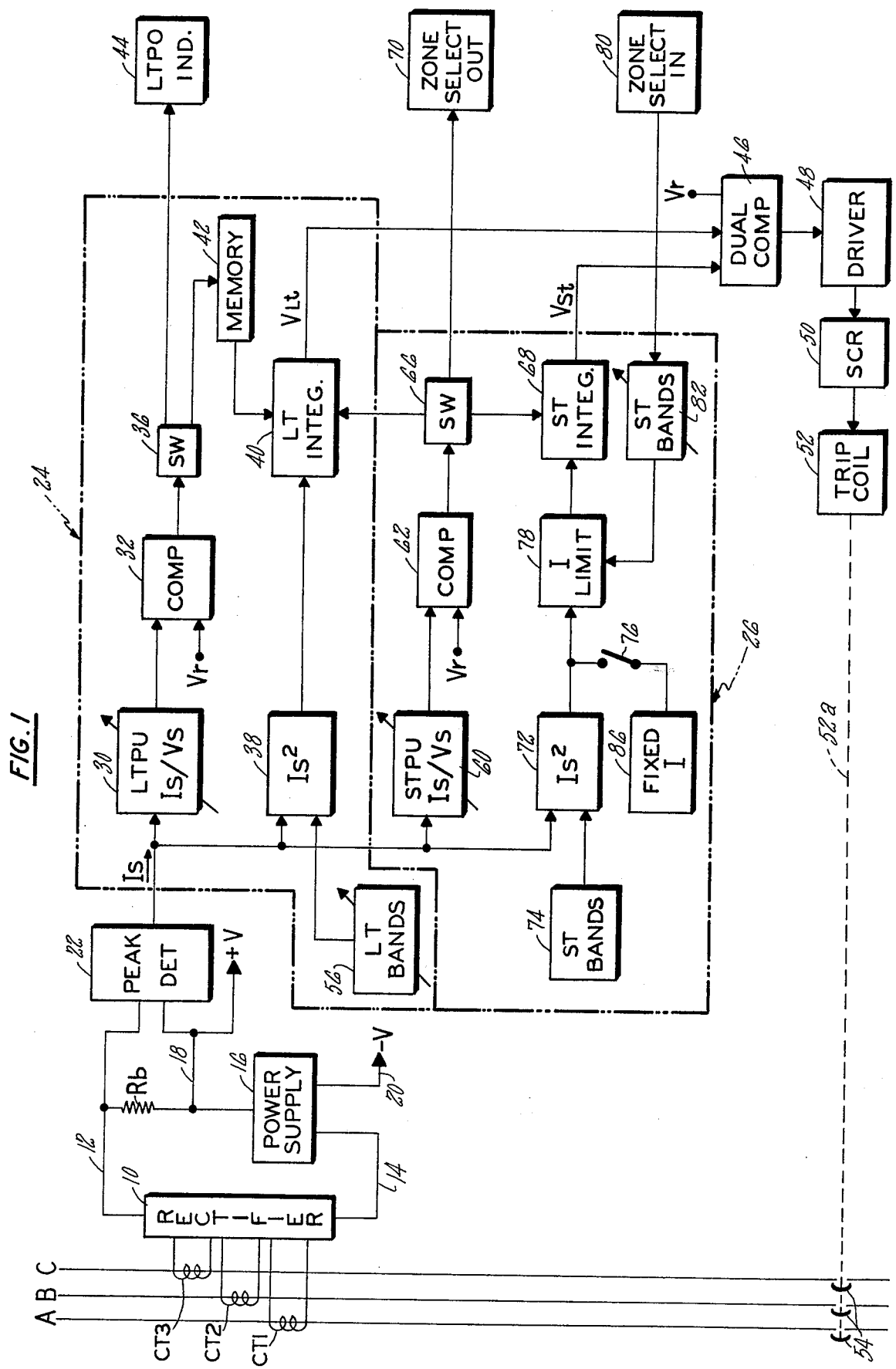
FIG. 1 is a generalized block diagram of a circuit breaker static trip unit embodying the overcurrent signal processing circuitry of the present invention.

Referring to FIG. 1, a static trip unit is disclosed for incorporation in a circuit breaker pursuant to providing overcurrent protection for a three-wire power distribution circuit consisting of three line or phase conductors A, B and C. The currents in these three phase conductors are individually sensed by current transformers CT1, CT2 and CT3. The multi-turn secondary windings of these current transformers are connected to a full-wave diode rectifying network, generally indicated at 10, whose construction may be that disclosed in applicant's commonly assigned U.S. Pat. No. 4,115,829. Positive going full-wave rectified current flows out of rectifying network 10 on bus 12 and returns via negative bus 14. The current on bus 12 flows through a burden resistor Rb pursuant to developing a voltage thereacross of a magnitude proportional to the magnitude of the highest of the phase currents flowing in conductors A, B and C.

A power supply 16, preferably of the construction disclosed in my commonly assigned copending application, Ser. No. 062,388, entitled "Power Supply for Circuit Breaker Trip Unit", filed July 31, 1979, is connected between the lower end of burden resistor Rb and bus 14. The power supply functions to develop on a bus 18, connected at its junction with the burden resistor, a regulated supply voltage V which is positive relative to the voltage appearing on a supply bus 20. Buses 12 and 18 are also connected as separate inputs to a peak detector 22 responding to the signal voltage developed across the burden resistor. The peak detector may be constructed in the manner disclosed in my commonly assigned, copending application, Ser. No. 062,460, entitled "Fast Recovery Peak Detector", filed July 31, 1979. The peak detector converts the peak signal voltage appearing across the burden resistor to a proportionate current signal Is which is jointly supplied to a long-time trip mode network, generally indicated at 24, and a short-time trip mode network, generally indicated at 26. While not shown in FIG. 1, a typical circuit breaker static trip unit would further include an instantaneous trip mode network operating without intentional delay to initiate a circuit breaker trip function in response to currents of short circuit proportions flowing in any one of the distribution circuit conductors A, B, C.

Figure 2:
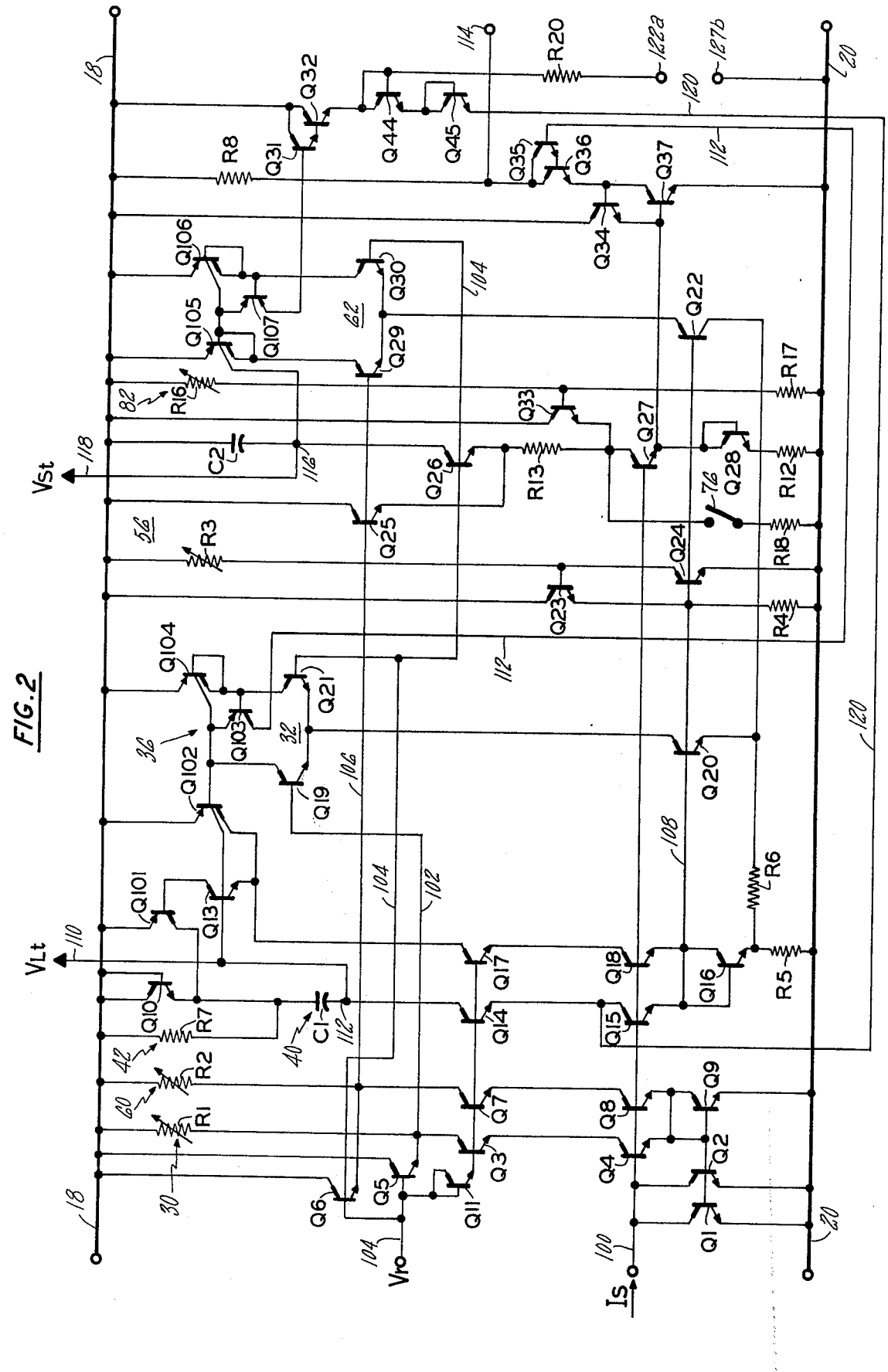
FIG. 2 is a detailed circuit schematic diagram of the overcurrent signal processing circuitry of FIG. 1.

The long-time and short-time trip mode networks, detailed in FIG. 2, are equipped with adjustable settings pursuant to establishing a family of trip time curves, commonly indicated at 28 in FIG. 5. Long-time trip mode network 24, seen generally in FIG. 1, includes an adjustable long-time pickup circuit 30 operating to convert the current signal Is received from peak detector 22 into a proportionate voltage signal Vs which is applied as one input to a comparator 32. The other input to this comparator is a reference voltage Vr. Adjustment of the long-time pickup circuit establishes the level of overcurrent in any one of the three distribution circuit conductors which must be exceeded before the long-time trip mode network 24 becomes operative. Referring to FIG. 5, this adjustment is seen to shift the upper vertical portion of the trip time curve family 28 to the left or right, as represented by three long-time pickup bands 34a, 34b, 34c. When any one of these phase currents exceeds the selected one of these long-time pickup bands, the voltage signal Vs at the output of long-time pickup circuit 30 causes comparator 32 to develop an output for actuating a switch 36.

At the same time, the current signal Is at the output of detector 22 is supplied to a squaring circuit 38 which develops an output current proportional to the square of the current signal for integration by a long-time integrating circuit 40. Activation of switch 36 is operative via a memory circuit 42 to condition the long-time integrating circuit 40 to begin integrating the squared current signal issued by squaring circuit 38 so long as the current in any one of the distribution circuit phase conductors exceeds the long-time pickup level established by long-time pickup circuit 30. In addition, switch 36 activates a long-time pickup indicator 44 effective in indicating that a long-time delay trip function is being timed out. The output of the long-time integrator is in the form of a time varying voltage Vlt which is supplied as one input to a dual comparator 46. A second input to this comparator is the reference voltage Vr. When this voltage achieves a predetermined relationship with respect to the reference voltage, the dual comparator activates a driver circuit 48 to trigger a thyristor 50, such as a silicon controlled rectifier. This thyristor goes into conduction to draw activating current through a trip coil 52 which is mechanically coupled, as indicated diagrammatically at 52a, to circuit breaker contacts 54 such as to trip these contacts open, thereby interrupting current flow in all three phase conductors of the distribution circuit.

Also included in the long-time trip mode network 24 is a long-time bands select circuit 56 operative to adjustably control the squaring circuit 38 such as to vary the proportionality of its squared current output signal to the current signal Is supplied to its input. Thus, as seen in FIG. 5, long-time bands select circuit 56 is adjusted to select one of the three illustrated long-time delay $I^2t$ bands 58a, 58b, 58c against which the overcurrent signal Is is to be measured.

As will be seen in FIG. 2, the memory 42 is included in long-time trip mode network 24 to controllably discharge the long-time integrator 40 should the current signal Is drop below the long-time pickup while the long-time trip mode network is timing out any long-time delay. That is, memory 42 functions to reverse the rate of change of the voltage Vlt at the output of integrator 40 such that the integrator is gradually reset to zero at a preestablished rate. If the overcurrent signal Is then rises above the long-time pickup level, switch 36 is again activated via comparator 32 and integrator 40 is again conditioned to integrate the squared current signal output from squaring circuit 38, thereby again reversing the rate of change of its output voltage Vlt. It is thus seen that the long-time integrator 40 is not abruptly reset to zero each time the overcurrent signal Is drops below the established long-time pickup level. Consequently, the long-time trip mode network 24 automatically takes into account any intermittency in an overcurrent condition on the distribution circuit while involved in timing a long-time trip function.

Still referring to FIG. 1, short-time trip mode network 26 includes a short-time pickup circuit 60 operating to convert the overcurrent signal from peak detector 22 to a proportionate voltage signal Vs. This voltage signal is applied to a comparator 62 together with reference voltage Vr. The short-time pickup circuit is selectably adjusted such as to establish any one of a plurality of short-time pickup bands ranging from a minimum band 64a to a maximum band 64b, as seen in FIG. 5. When it is sensed that the overcurrent signal Is exceeds the selected short-time pickup band, comparator 62 conditions a switch 66 to reset and disable the long-time integrator 40, enable a short-time integrator 68, and activate a zone selective output circuit 70. As will be seen in connection with FIG. 4, the zone selective output circuit functions to signal an upstream circuit breaker that a short-time delay is being timed out in a downstream circuit breaker.

The current signal Is at the output of peak detector 22 is also squared in a squaring circuit 72 included in short-time trip mode network 26. A short-time band circuit 74 controls this squaring circuit so as to establish a predetermined proportionality of the squared current signal output to the current signal output. The squared current output from squaring circuit 72 is supplied through a current-limiting circuit 78 to the short-time integrator 68, pursuant to developing a time varying voltage signal Vst for application as a third separate input to dual comparator 46. With switch 76 in its position shown in FIG. 1, a short-time trip mode network 26 establishes a short-time $I^2t$ delay band 80 seen in FIG. 5. Controlling the short-time integrator 68 via current limiter 78 is a short-time bands select circuit 82 which functions to truncate the $I^2t$ short-time delay band into a selected one of three fixed short-time delay bands 84a, 84b and 84c, seen in FIG. 5. When the time varying voltage Vst appearing at the output of short-time integrator 68 achieves a predetermined relationship with respect to the reference voltage Vr, dual comparator 46 signals driver 48 to initiate a circuit breaker trip function in the manner previously generally described in connection with the long-time trip mode network 24.

Also included in the short-time trip mode network 26 is a fixed current source 86 which can be connected together with squaring circuit 72 to the input of current limiter 78 via switch 76. Under these circumstances, a fixed current output is developed by current limiter 78 for integration by short-time integrator 68. Short-time band select circuit 82 again controls short-time integrator 68 via current limiter 78 to establish the selected one of the fixed short-time delays 84a, 84b, 84c in FIG. 5. It is seen that under these circumstances, the short-time $I^2t$ time delay band 80 is switched out of the trip time curve in FIG. 5 when switch 76 is conditioned to connect the fixed current source 86 to the input of short-time integrator 68.

As also generally seen in FIG. 1, a zone select input circuit 80 responds to a signal issued by a zone select output circuit 70 in a downstream breaker while involved in timing out a short-time delay by conditioning the short-time band select circuit 82 to, for example, switch from the minimum short-time delay band 84c to the pre-selected maximum short-time delay band 84a. Assuming that the minimum short-time delay has been established in the downstream circuit breaker, it should trip first to remove the overcurrent condition before the upstream breaker can time out the maximum short-time delay. Thus, the upstream breaker is not tripped, and it continues to feed the sound portion of the distribution network. Moreover, since the upstream breaker is automatically set at its minimum short-time delay in the absence of a zone select signal, it can respond on a minimum short-time delay basis to a fault condition intermediate it and the downstream breaker.

Turning to FIG. 2, current signal Is from peak detector 22 in FIG. 1 is applied to a signal bus 100 which is connected to the bases of transistors Q4 and Q8. This signal bus is also connected in parallel to the negative power supply bus 20 through the collector-emitter circuits of a transistor Q1 and a transistor Q2. The bases of these transistors are connected in common with the base of a transistor Q9, whose emitter is connected to bus 20. The emitters of transistors Q4 and Q8 are connected in common with the collector and base of transistor Q9. Thus, one-half of the signal current Is appearing on bus 100 flows through the collector-emitter circuit of transistor Q1, while the other half flows through the collector-emitter circuit of transistor Q2. Since transistors Q1 and Q2 are seen to be connected with transistor Q9 as a current mirror, the collector current of the latter transistor is equal to one-half the signal current. The source of the transistor Q9 collector current is shared equally by transistors Q4 and Q8, and consequently the collector currents of these two transistors is equal to one-quarter the signal current Is. The collector of transistor Q4 is connected through the emitter-collector circuit of a transistor Q3 and a variable resistor R1 to the positive power supply voltage bus 18. Similarly, the collector of transistor Q8 is connected through the emitter-collector circuit of a transistor Q7 and a second variable resistor R2 to bus 18.

As will be seen, resistor R1 comprises the long-time pickup circuit 30 in FIG. 1, while variable resistor R2 comprises the short-time pickup circuit 60. Thus, the voltage drop developed across resistor R1 by virtue of a current equal to one-quarter of the signal current Is flowing therethrough is applied via a lead 102 to the base of a transistor Q19. This transistor is connected with transistor Q21 as a differential comparator corresponding to comparator 32 in FIG. 1. The reference voltage Vr is applied over a reference voltage bus 104 to the base of transistor Q21. Similarly, the voltage developed across variable resistor R2 by virtue of a current equal to one-quarter of the current signal Is flowing therethrough is applied via a voltage signal bus 106 to the base of a transistor Q29. This transistor is connected with transistor Q30 as a differential comparator which corresponds to comparator 62 in FIG. 1. Reference voltage Vr on bus 104 is applied to the base of transistor Q30.

In order to maintain a fixed relationship between the signal current Is and the current drawn through variable resistor R1, the collector of resistor Q4 must be held at a fixed level. This is accomplished by transistor Q3 connected as a cascode buffer between the reference voltage bus 104 and the collector of transistor Q4. The base potential of transistor Q3 is established at one base-emitter drop below the reference voltage by diode-connected transistor Q11. Transistor Q5 has its base connected to the reference voltage bus 104 and its collector-emitter circuit connected in shunt with variable resistor R1. Thus, this transistor limits the magnitude of the voltage signal developed across resistor R1 to the difference between the power supply voltage on bus 18 and the reference voltage Vr plus one base-emitter voltage drop for all levels of current signal in excess of the long-time pickup voltage. This prevents overdriving of the comparator transistors Q19, Q21. Transistor Q6 performs the same limiting function for the voltage signal developed across variable resistor R2. To maintain a fixed relationship between the signal current and the current through variable resistor R2, the cascode buffer transistor Q7 has its base connected in common with the base of Q3 to the emitter of transistor Q11.

Current signal bus 100 is also connected to the base of a transistor Q15 whose emitter is connected over a bus 108 to the base of a transistor Q24. The collector of this latter transistor is connected through a variable resistor R3 to positive supply bus 18, while its emitter is connected directly to the negative supply bus 20. The collector and base of transistor Q24 are also respectively connected to the base and emitter of a transistor Q23, whose collector is connected to the positive supply bus.

A resistor R4 is connected between the base of transistor Q24 and negative supply bus 20. Returning to transistor Q15, it is seen that its emitter is also connected to the base of a transistor Q16, whose collector is connected to bus 108 and emitter is connected to the negative supply bus through a resistor R5.

Transistors Q1, Q2, Q4, Q8, Q9, Q15, Q23 and Q24 and their associated circuitry constitute a true logarithmic squaring circuit whose operation is predicated on the fundamental characteristics of a diode or transistor, specifically the base-emitter junction of a transistor, in that the voltage developed across a base-emitter transistor junction is proportional to the natural logarithm of the current flowing through that junction. Conversely, the current flowing through such a junction is exponentially related to, i.e., the antilog of, the voltage across the junction. Thus, the current signal appearing on signal bus 100, which is shared equally by transistors Q1 and Q2, produces a base-emitter voltage on transistor Q9 corresponding to the logarithm of one-half of the current signal and base-emitter voltages on transistors Q4 and Q8 each corresponding to the logarithm of one-fourth the current signal Is. The sum of the transistor Q9 base-emitter voltage and the base-emitter voltage of either of transistors Q4 and Q8 represents the logarithm of the current signal squared divided by 8. This voltage sum is applied via signal bus 100 to the base of transistor Q15. A bias current drawn from positive bus 18 through resistor R3 flows into the base of transistor Q23 and the collector of transistor Q24 such as to produce a fixed voltage corresponding to the logarithm of the bias current at the base of transistor Q24 which is applied to the emitter of transistor Q15 via bus 108. It is thus seen that the resulting base-emitter voltage on transistor Q15 is equal to the base-emitter voltages of transistors Q4 or Q8, plus Q9 minus the fixed voltage developed at the base of transistor Q24. It can be readily shown mathematically that the collector current thus produced in transistor Q15 is proportional to the antilog of its base emitter voltage, and hence is equal to one-eighth of the square of the signal current Is divided by the bias current flowing through resistor R3. The collector of transistor Q15, which constitutes the output of long-time squaring circuit 38 in FIG. 1, is connected through the collector-emitter circuit of a transistor Q14, a capacitor C1, and the collector-emitter circuit of a diode-connected transistor Q10 to positive supply bus 18. Thus, the collector current of transistor Q15 is utilized to charge capacitor C1, which corresponds to the long-time integrator 40 in FIG. 1. Resistor R3 is adjusted to different values of bias current for transistors Q23 and Q24 in squaring circuit 38, and thus corresponds to the long-time bands select circuit 56 in FIG. 1 which, as previously described, establishes one of the three $I^2t$ long-time bands 58a, 58b, 58c, seen in FIG. 5.

Considering long-time comparator 32, the emitters of transistors Q19 and Q21 thereof are connected together through the collector-emitter circuit of a transistor Q20, a resistor R6 and a resistor R5 to negative bus 20. The base of Q20 is connected to bus 108 such as to establish this transistor as a source of emitter current for the transistors Q19 and Q21. The collector of transistor Q19 is connected to the base of a dual collector transistor Q102 and to one collector of dual collector transistor Q104. The collector of Q21 is connected to the other collector of transistor Q104, which is connected in common with its base, and to the base of transistor Q103 whose emitter is connected in common with the base of transistor Q102, the collector of transistor Q19, and one collector of transistor Q104. The emitters of transistors Q102 and Q104 are commonly connected to positive supply bus 18. One collector of transistor Q102 is connected through the collector-emitter circuits of transistors Q17, Q18 and Q16 and resistor R5 to the negative supply bus 20. The other collector of transistor Q102 is connected to a lead 110 running from the lower terminal 112 of integrating capacitor C1. As will be seen, the voltage appearing on this capacitor as a consequence of being charged by the current output of squaring circuit 38 constitutes the integrator output voltage Vlt which is applied to dual comparator 46 in FIG. 1. Diode connected transistor Q10 included in the charging current path for integrating capacitor C1 is shunted by the emitter-collector circuit of a transistor Q101, whose base is connected to the junction between one of the collectors of transistor Q102 and the collector of transistor Q17 through the collector-emitter circuit of a transistor Q13. The base of this latter transistor is connected to the other collector of transistor Q102.

As long as the current signal Is at the output of peak detector 22 in FIG. 1 is less than the long-time pickup established by the selected resistance value of resistor R1, the replicated current signal drawn through this resistor produces a voltage drop thereacross which is insufficient to lower the voltage on bus 102 into equality with the reference voltage Vr applied to bus 104. Consequently, transistor Q19 in comparator 32 conducts all of the emitter current supplied by source transistor Q20. Transistor Q21 is thus cut off, thereby rendering transistors Q103 and Q104 nonconductive. Transistor Q102, on the other hand, is rendered conductive to shunt charging current from integrating capacitor C1 through one of its emitter-collector circuits. It will be noted that the bases of transistors Q14 and Q17 are connected in common, as are the bases of transistors Q15 and Q18. The emitters of these latter two transistors are also connected in common. Consequently, the charging current for integrating capacitor C1 appearing on the collector of transistor Q15 is replicated on the collector of transistor Q18. While transistor Q102 is rendered conductive by comparator 32, it shunts this replicated charging current from the emitter-base junction of transistor Q101 through its other emitter-collector circuit.

When the current signal Is exceeds the long-time pickup level established by resistor R1, the voltage on bus 102 drops below the reference voltage on bus 104, whereupon transistor Q21 goes into conduction and transistor Q19 turns off. Transistor Q102 is turned off and transistor Q104 is driven into saturation. With transistor Q102 turned off, it no longer shunts charging current from capacitor C1 or the replicated charging current from the emitter-base junction of transistor Q101. Transistor Q101 is thus driven into saturation by this replicated charging current drawn through its emitter-base junction and the collector-emitter circuit of transistor Q13. Charging current for the integrating capacitor is then drawn through its emitter-collector circuit rather than through diode-connected transistor Q101 thus avoiding the diode voltage drop imposed thereby. As integrating capacitor C1 is being charged, the voltage at junction 112, to which lead 110 is connected, begins falling from the supply voltage on bus 18 toward the reference voltage Vr. When this voltage Vlt eventually drops into equality with the reference voltage Vr, dual comparator 46 in FIG. 1 activates driver 48 to initiate a trip function.

If, while the long-time trip mode network is timing out in long-time trip function, the signal current Is drops below the established long-time pickup level, the voltage on bus 102 rises above the reference voltage on bus 104, whereupon transistor Q19 in comparator 32 again begins conducting emitter current in lieu of transistor Q21. Transistor Q102 then turns on to turn off transistors Q101, Q13, and shunt charging current from the integrating capacitor C1. In addition, transistor Q102 abruptly raises the voltage at junction 112 substantially to the supply voltage on bus 18. The voltage on the upper terminal of capacitor C1 is thus raised above the supply voltage on bus 18 by the amount of charge accumulated on this integrating capacitor. Since diode-connected transistor Q10 is then back-biased, the integrating capacitor must discharge through a resistor R7 shunting the collector-emitter circuit of this transistor.

If, before the integrating capacitor completely discharges through resistor R7, the signal voltage rises above the long-time pickup level, transistors Q19 and Q102 are turned off, and the charge remaining on capacitor C1 is retained as charging is resumed. It is thus seen that long-time trip mode network 24 is capable of responding to an intermittent overcurrent condition on the distribution circuit that it otherwise could not if the integrating capacitor C1 was abruptly discharged each time the signal current dropped below the long-time pickup level. From the foregoing description, it is seen that transistor Q102 corresponds to the switch 36 in FIG. 1, while the combination of resistor R7, transistors Q101, Q13, and diode-connected transistor Q10 corresponds to memory 42. As will be seen, transistor Q103 is also included in switch 36.

From FIG. 1, it is seen that switch 36 also effects activation of long-time pickup indicator 44. From FIG. 2, it is seen that when transistor Q102 is turned off, transistors Q104 and Q103 are turned on. The collector of transistor Q103 is brought out on a lead 112 for connection to the base of a transistor Q35 connected with transistor Q36 as a Darlington pair. The common collectors of transistors Q35 and Q36 are connected through resistor R8 to positive supply bus 18, while the emitter of transistor Q36 is connected to the collector-emitter circuit of transistor Q37 to negative supply bus 20.

The junction between the Darlington pair transistors Q35, Q36 and resistor R8 is brought out to a terminal 114 which, as seen in FIG. 3, is connected to the base of a transistor Q204 included in long-time pickup indicator circuit 44. The base of this transistor is connected to terminal 114, while its collector is directly connected to the negative supply bus. The emitter of this transistor is connected through a current limiting resistor R10 to the positive supply bus 18 through a light-emitting diode D1.

From the foregoing description, it is seen that when the long-time trip mode network 24 is timing out a long-time trip function, transistor Q103 is turned on to, in turn, drive the Darlington transistor pair Q35, Q36 into conductive. The voltage at terminal 114 thus drops to a level sufficient to turn on transistor Q204 in FIG. 3, and activating current for light-emitting diode D1 is drawn from positive supply bus 18. The light emitted by this diode constitutes a signal indication that the long-time trip mode network is in the process of timing out a potential long-time trip function.

Now considering the circuit details of the short-time trip mode network 26 of FIG. 1 as disclosed in FIG. 2, the voltage signal appearing on bus 106, connected to the lower end of resistor R2, is applied to the base of transistor Q29 in comparator 62 of FIG. 1. The reference voltage Vr on bus 104 is applied to the base of differential comparator transistor Q30. Bus 108 is connected to the base of a transistor Q22, such as to establish this transistor as a source of emitter current for transistors Q29 and Q30. Current signal bus 100 is connected to the base of a transistor Q27, whose emitter is connected through a diode connected transistor Q28 and a resistor R12 to negative supply bus 20, to the base of a transistor Q37, and the emitter of a transistor Q34. The emitter of transistor Q37 is connected directly to the negative supply bus 20, while the collector of transistor Q34 is connected directly to the positive supply bus 18. The collector of transistor Q37 and base of transistor Q34 are connected in common and through the collector-emitter circuit of transistor Q36 and resistor R8 to the positive supply bus.

It will be observed that the voltage applied to the base of transistor Q15 pursuant to providing a collector current proportional to the square of signal current Is is also applied to the base of transistor Q27 via bus 100. The bias current flowing through resistor R8 into the base of transistor Q34 and the collector of transistor Q37 produces a fixed voltage corresponding to the logarithm of this bias current at the base of transistor Q37 which is seen to be applied to the emitter of transistor Q27. Thus, the resulting base-emitter voltage on transistor Q27 produces a collector current therein which is proportional to the square of the signal current Is divided by the bias current flowing through resistor R8. The collector of transistor Q27 is connected through a resistor R13, the collector-emitter circuit of a transistor Q26 and a capacitor C2 to positive supply bus 18. Thus, the collector current of transistor Q27 is utilized to charge capacitor C2 (short-time integrator 72 in FIG. 1) pursuant to establishing the $I^2t$ short-time delay band 80 in FIG. 5. The resistance value of resistor R8 is selected to provide the appropriate proportionality of charging current to signal current pursuant to achieving the desired positioning of the short-time delay band 80 in the circuit breaker's trip time curve of FIG. 5.

As long as the current signal Is is below the short-time pickup level established by the resistance setting of resistor R2 in the short-time pickup circuit 60, the signal voltage on bus 106 is more positive than the reference voltage Vr, and consequently, transistor Q29 in the short-time comparator 62 conducts all of the emitter current. Thus, dual collector transistor Q105 is driven into saturation by the collector current of transistor Q29. Since one of the emitter-collector circuits of transistor Q105 is connected in shunt with short-time integrating capacitor C2, the saturation of this transistor shunts charging current from this integrating capacitor. On the other hand, when the signal current rises above the short-time pickup level, the voltage on bus 106 drops below the reference voltage Vr on bus 104. Transistor Q29 is turned off, and transistor Q30 is turned on to conduct all the emitter current for short-time comparator 62. Transistors Q106 and Q107 connected with the collector of transistor Q30 are driven into conduction, while transistor Q105 is rendered non-conductive to cease shunting charging current drawn by the collector of transistor Q27 from the short-time integrating capacitor C2. The voltage appearing at the lower terminal 116 of short-time integrating capacitor C2 is brought out on lead 118 as the signal Vst for application to dual comparator 46 in FIG. 1. When this voltage signal falls into equality with the reference voltage Vr, dual comparator 46 activates driver 48 to initiate a circuit breaker trip function.

Pursuant to truncating the $I^2t$ short-time delay band 80 into a selected one of the fixed short-time delay bands 84a, 84b, 84c in FIG. 5, a voltage divider, consisting of a variable resistor R16 and a fixed resistor R17, is connected between supply buses 18 and 20. The junction between these two resistors is applied to the base of a transistor Q33 whose collector is connected to the positive supply bus and emitter is connected to the junction between resistor R13 and collector of transistor Q27. The junction of resistor R13 and the emitter of transistor Q26 is connected to the emitter of a transistor Q25. The collector of this transistor is connected to the positive supply bus 18, while its base is connected to the short-time pickup sigal voltage bus 106. The base of transistor Q26 is connected to the reference voltage bus 104. Under these circumstances, it is seen that transistor Q25 is turned on so long as the current signal Is is below the short-time pickup level established by resistor R2, inasmuch as the voltage on bus 106 is then more positive than reference voltage Vr. The conduction of transistor Q25 is effective in shunting charging current from integrating capacitor C2. This is done due to the fact that transistor Q105 is connected as a current mirror, and thus its ability to shunt charging current is limited by the collector current of transistor Q29 which, in turn, is determined by the differential comparator emitter current source transistor Q22. As will be seen later, this current limiting action is utilized to achieve controlled discharge of integrating capacitor C2 when the current signal drops below the short-time pickup level.

When the current signal Is exceeds the short-time pickup level, the voltage on bus 106 falls below the reference voltage level, and transistor Q25 is turned off to cease shunting current to capacitor C2. Moreover, comparator 62 turns off transistor Q105, such that it too no longer shunts charging current from integrating capacitor C2. If the magnitude of the current signal is such that the integrating capacitor charging current produces a voltage drop across resistor R13 sufficient to lower the emitter of transistor Q33 one base emitter voltage drop below the voltage established at its base by the resistance setting of resistor R16, this transistor turns on to shunt excess charging current from capacitor C2. In fact, the action of capacitor Q33 is to limit the charging current for integrating capacitor C2 to a fixed magnitude for all levels of signal current Is in excess of the signal level necessary to turn this transistor on. The magnitude of this limited level of charging current is determined by the selection of the resistance value for resistor R16 effective in establishing one of the three fixed time delay bands 84a, 84b, 84c, seen in FIG. 5. From the foregoing description, it is seen that resistor R16 corresponds to the short-time bands select circuit 82 in FIG. 1, while transistor Q33 corresponds to the current limiter 78.

As briefly alluded to above, if the signal current Is drops below the short-time pickup level established by resistor R2, short-time comparator 62 turns on dual collector transistor Q105. Capacitor C2 then begins discharging through one emitter-collector circuit of transistor Q105. Since the magnitude of this discharge current is limited by the current drawn by transistor Q29 of short-time comparator 62 through its other emitter-collector circuit, capacitor C2 is discharged at a prescribed rate, rather than abruptly discharged. If the current signal Is again rises above the short-time pickup level before integrating capacitor C2 is completely discharged, the consequent non-conduction of transistor Q105 retains the remaining charge on capacitor C2 and it beings recharging from that point. It is thus seen that the short-time trip mode network 26 is also capable of responding to intermittent fault currents that it might not otherwise respond to if the integrating capacitor were to be completely discharged each time the current signal dropped below the short-time pickup level.

Still referring to FIG. 2, when short-time comparator 62 operates in response to a current signal in excess of the short-time pickup level, transistors Q106 and Q107 are turned on, the latter having its collector connected to drive Darlington pair transistors Q31 and Q32. The emitter of transistor Q32 is connected via diode connected transistors Q44 and Q45 and a lead 120 back to the collector of transistor Q15 in long-time squaring circuit 38. Thus, when the current signal exceeds the short-time pickup level, collector current for transistor Q15 is drawn through the Darlington pair transistors Q31, Q32 and diode connected transistors Q44, Q45, in lieu of charging long-time integrating capacitor C1. Consequently long-time integration is essentially halted while the short-time trip mode network is timing out a short-time delay.

When it is desired to switch out the I²t short-time delay band 80 in FIG. 5, switch 76 of FIG. 1 is closed to connect the collector of transistor Q27 to negative supply bus 20 through a resistor R18. The value of resistance R18 is selected such that, upon closure of switch 76, sufficient current is drawn through resistor R13 to turn on transistor Q33 for all values of signal current. Consequently, integrating capacitor C2 is charged at a rate consistent with the one fixed short-time delay band 84a, 84b, or 84c established by the selected resistance of resistor R16.

If the static trip unit is to be equipped with zone selective interlocking the emitter of Darlington-connected transistor Q32 is brought out through a resistor R20 to a terminal 122a, which is paired with a terminal 122b connected to negative supply bus 20. As seen in FIG. 4, a light emitting diode D2 is connected across terminals 122a, 122b. When the current signal Is exceeds the short-time pickup level, comparator 62 turns on transistor Q107, which, in turn, drives the Darlington transistor pair Q31, Q32 into conduction. Current is thus drawn through resistor R20 to energize light emitting diode D2. The light emitted by this diode activates a phototransistor Q50 optically coupled therewith. This phototransistor then acts as the source of a current signal which is filtered by a filter network 124 and fed to a zone interface module 126. This current signal is amplified in the interface module and fed to a filter network 128 pursuant to activating a second light emitting diode D3. The light emitted by this diode is then optically coupled to activate a second phototransistor Q52 included in an upstream circuit breaker. The base and emitter of photo transistor Q52 are connected together by the parallel combination of a transistor R22 and a capacitor C8. Its emitter is connected to the arm of a selector switch S1. The variable resistor R16 in FIG. 2 is shown in FIG. 4 being provided with a pair of taps brought out to contacts engageable by the wiper of selector switch S1. A third contact is connected in common with the collector of phototransistor 52 and positive supply bus 18.

It is seen that the wiper of this selector switch can be positioned to its various contacts to select different values of resistance for insertion in series with resistor R17. As previously described in conjunction with FIG. 2, the junction between resistors R16 and R17 is connected to the base of transistor Q33 operating in conjunction with the selected resistance of resistor R16 to establish one of the three fixed short-time delay bands 84a, 84b, 84c in FIG. 5. In the circuit configuration shown in FIG. 4, it is seen that until phototransistor 52 is rendered conductive, selector switch S1 is effectively removed from the circuit, and consequently the full resistance of resistor R16 appears in series with resistor R17. Under these circumstances, the minimum fixed short-time delay band 84c of FIG. 5 is established. When phototransistor Q52 is rendered conductive by a zone selective interlock signal issued from a downstream circuit breaker, a portion of the resistance of resistor R6 is switched out of this potential divider, assuming the selector switch is positioned to either one of the lower two taps. When positioned at its lowermost tap seen in FIG. 1, the lowest value resistance of resistor R6 is inserted in the voltage divider, thus establishing the maximum fixed short-time band delay 84a.

Thus, under normal circumstances the upstream breaker is at its minimum short-time delay band so as to initiate a short-time trip function after the minimum fixed short-time delay in response to a fault condition intermediate the upstream and downstream breakers. If, on the other hand, the fault condition is downstream of the downstream breaker, such that the downstream breaker is also responsive thereto, a zone selective interlock signal will be issued by the downstream breaker as it begins timing out a short-time trip function. In response to this zone selective interlock signal, the upstream breaker, by virtue of the condition of its phototransistor Q52 in FIG. 4, switches from its minimum fixed short-time delay to its pre-selected maximum fixed short-time delay. Under these circumstances, the downstream breaker is afforded ample time to clear the fault condition, leaving the upstream breaker untripped to continue electrical service to the remaining sound portion of the distribution network. When zone selectivity is not used, the arm of switch 51 is connected directly to positive supply bus 18 to enable selection of the short-time delay band in effect.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. In a circuit breaker static trip unit having at least one current transformer for developing a secondary winding current proportional to a distribution circuit phase current flowing in its primary, a rectifier for rectifying the secondary current, and a detector circuit for developing an overcurrent signal proportional to the rectified secondary current; signal processing circuitry comprising, combination:

A. a long-time trip mode network including (1) adjustable first means for establishing a selected long-time pickup level against which said overcurrent signal is measured,
(2) a first squaring circuit for adjustably developing a first charging current proportional to the square of said overcurrent signal,
(3) a first integrating capacitor connected to be charged by said first charging current pursuant to developing a first time varying voltage signal, and
(4) first switch means conditioned by said first means to shunt said first charging current from said first capacitor while said overcurrent signal is below said long-time pickup level and to direct said first charging current through said first capacitor while said overcurrent signal exceeds said long-time pickup level;

B. a short-time trip mode network including
(1) adjustable second means for establishing a selected short-time pickup level against which said overcurrent signal is measured,
(2) a second squaring circuit for developing a second charging current proportional to the square of said overcurrent signal,
(3) a second integrating capacitor connected to be charged by said second charging current pursuant to developing a second time varying voltage signal,
(4) second switch means conditioned by said second means to
  (a) shunt said second charging current from said second capacitor while said overcurrent signal is below said short-time pickup level,
  (b) direct said second charging current through said second capacitor while said overcurrent signal exceeds said short-time pickup level, and
  (c) shunt said first charging current from said first capacitor while said overcurrent signal exceeds said short-time pickup level, and
(5) adjustable fixed short-time delay means responsive to said second charging current for limiting the magnitude thereof to a pre-selected fixed level; and C. Comparator means responsive to said first and second time varying voltage signals for issuing a circuit breaker trip initiating signal when either of said voltage signals achieves a predetermined reference voltage level.

2. The signal processing circuitry defined in claim 1, which further includes a current source and a switch manually operable to connect said current source with said second integrating capacitor such that said second capacitor is charged by a third charging current of a pre-selected fixed level as limited by said short-time delay means while said overcurrent signal exceeds said short-time pickup level.

3. The signal processing circuitry defined in claim 1, wherein said first switch means additionally activates an indicator while said overcurrent signal exceeds said long-time pickup level.

4. The signal processing circuitry defined in claim 1, which further includes means for generating a zone selective interlock output signal and said second switch means additionally operating to activate said means to issue said zone selective interlock output signal while said overcurrent signal exceeds said short-time pickup level.

5. The signal processing circuitry defined in claim 1, which further includes means responsive to a zone selective interlock input signal for conditioning said short-time delay means to automatically change the magnitude level to which said second charging current is limited, whereby to establish a fixed short-time delay of a longer duration.

6. The signal processing circuitry defined in claim 5, which further includes means for generating a zone selective interlock output signal and said second switch means additionally operating to activate said means to issue said zone selective interlock output signal while said overcurrent signal exceeds said short-time pickup level.

7. The signal processing circuitry defined in claim 6, which further includes a current source and a switch manually operable to connect said current source with second integrating capacitor such that said second capacitor is charged by a third charging current of a pre-selected fixed level as limited by said short-time delay means while said overcurrent signal exceeds said short-time pickup level.

8. The signal processing circuitry defined in claim 7, wherein said first switch means additionally activates an indicator while said overcurrent signal exceeds said long-time pickup level.

9. The signal processing circuitry defined in claim 1, which further includes current mirrors responsive to said overcurrent signal for developing proportional replications thereof for separate application to said first and second pickup level establishing means and said first and second squaring circuits.

10. The signal processing circuitry defined in claim 1, which further includes a memory circuit conditioned by said first switch means to enable discharging of said first integrating capacitor at a controlled rate, said memory circuit including a diode-connected transistor connected in the charging path for said first integrating capacitor, a discharge resistor shunting said diode-connected transistor, a first transistor having a collector-emitter circuit shunting said diode-connected transistor and a base, and an additional current mirror developing a replication of said first charging current, said first switch means including a dual collector transistor rendered conductive while said overcurrent signal is below said long-time pickup level, said dual collector transistor having a first emitter-collector circuit connected to shunt said first charging current from said first integrating capacitor and a second emitter-collector circuit connected to shunt said replicated first charging current from the base of said first transistor.

11. In a circuit breaker static trip unit having at least one current transformer for developing a secondary winding current proportional to a distribution circuit phase current flowing in its primary, a rectifier for rectifying the secondary current, and a detector circuit for developing an overcurrent signal proportional to the rectified secondary current; signal processing circuitry comprising, in combination:
A. a long-time trip mode network including
  (1) adjustable first means for establishing a selected long-time pickup level against which said overcurrent signal is measured,
  (2) a first squaring circuit for adjustably developing a first charging current proportional to the square of said overcurrent signal, (3) a first integrating capacitor connected to be charged by said first charging current pursuant to developing a first time varying voltage signal,
(4) indicator means, and
(5) first switch means conditioned by said first means to shunt said first charging current from said first capacitor while said overcurrent signal is below said long-time pickup level and to jointly direct said first charging current through said first capacitor and activate said indicator means while said overcurrent signal exceeds said long-time pickup level; and B. a short-time trip mode network including
(1) adjustable second means for establishing a selected short-time pickup level against which said overcurrent signal is measured,
(2) a second integrating capacitor connected to be charged by a second charging current pursuant to developing a second time varying voltage signal,
(3) second switch means conditioned by said second means to
(a) shunt said second charging current from said second capacitor while said overcurrent signal is below said short-time pickup level,
(b) direct said second charging current through said second capacitor while said overcurrent signal exceeds said short-time pickup level, and
(c) shunt said first charging current from said first capacitor while said overcurrent signal exceeds said short-time pickup level, and
(4) adjustable fixed short-time delay means responsive to said second charging current for limiting the magnitude thereof to a pre-selected fixed level; and C. comparator means responsive to said first and second time varying voltage signals for issuing a circuit breaker trip initiating signal when either of said voltage signals achieves a predetermined reference voltage level.

12. The signal processing circuitry defined in claim 11, which further includes means for generating a zone selective interlock output signal and said second switch means additionally operating to activate said means to issue said zone selective interlock output signal while said overcurrent signal exceeds said short-time pickup level.

13. The signal processing circuitry defined in claim 12, which further includes means responsive to a zone selective interlock input signal for conditioning said short-time delay means to automatically change the magnitude level to which said second charging current is limited, whereby to establish a fixed short-time delay of a longer duration.

14. The signal processing circuitry defined in claim 11, which further includes current mirrors responsive to said overcurrent signal for developing proportional replications thereof for separate application to said first and second pickup level establishing means and said first and second squaring circuit.

15. In a circuit breaker static trip unit having at least one current transformer for developing a secondary current proportional to a distribution circuit phase current flowing in its primary, a rectifier for rectifying the secondary current, and a detector for developing a current signal proportional to the rectified secondary current; signal processing circuitry comprising, in combination:

A. multiple current mirrors for developing first and second replicated currents proportional to the current signal developed by the detector;
B. a first converter for converting said first replicated current to an adjustably proportional first voltage signal pursuant to establishing a selected long-time pickup overcurrent level for the distribution circuit phase currents;
C. a first squaring circuit for developing a first charging current adjustably proportional to the square of said second replicated current;
D. a first integrating capacitor connected to be charged by said first charging current pursuant to developing a first time varying voltage signal;
E. a first comparator connected with said first converter and comparing said first voltage signal with a reference voltage pursuant to determining when a distribution circuit phase current exceeds the selected long-time overcurrent pickup level;
F. first switch means conditioned by said first comparator to shunt said first charging current from said first integrating capacitor while the distribution circuit phase currents are below said selected long-time pickup overcurrent level and to direct said first charging current through said first capacitor while any one of the phase currents exceeds said long-time overcurrent pickup level;
G. means responsive to said first time varying voltage signal achieving an established threshold voltage upon the expiration of a long-time delay for issuing a circuit breaker trip initiating signal; and
H. a memory including a resistive discharge path conditioned by said first switch means to gradually drain charge from said first capacitor through said resistive discharge path only while, as a long-time delay is being timed out, a phase current drops below said long-time pickup overcurrent level.

16. The signal processing circuitry defined in claim 15, wherein said multiple current mirrors additionally develop third and fourth replicated currents proportional to the current signal developed by the detector, said signal processing circuitry further including A. a second converter for converting said third replicated current to an adjustably proportional second voltage signal pursuant to establishing a selected short-time pickup overcurrent level for the distribution circuit phase currents;
B. a second squaring circuit for developing a second charging current proportional to the square of said fourth replicated current;
C. a second integrating capacitor connected to be charged by said second charging current pursuant to developing a second time varying voltage signal, said means responsive to said first time varying voltage signal being also responsive to said second time varying voltage signal achievng said established threshold voltage upon the expiration of a short-time delay for issuing a circuit breaker trip initiating signal;
D. a second comparator connected with said converter for comparing said second voltage signal with a reference voltage pursuant to determining when a distribution circuit phase current exceeds said selected short-time overcurrent pickup level; and E. second switch means conditioned by said second comparator to shunt said second charging current from said second integrating capacitor while the distribution circuit phase currents are below said selected short-time pickup overcurrent level and to direct said second charging current through said second capacitor while any one of said phase currents exceeds said short-time overcurrent pickup level.

17. The signal processing circuitry defined in claim 15, which further includes an indicator activated under the control of said first switch means to provide signal indication while any one of the distribution phase circuits exceeds said long-time pickup overcurrent level.

* * * * *